(12) United States Patent
Luinstra

(10) Patent No.: US 7,728,099 B2
(45) Date of Patent: Jun. 1, 2010

(54) PREPARATION AND USE OF ULTRAHIGH-MOLECULAR-WEIGHT POLYCARBONATES

(75) Inventor: Gerrit Luinstra, Mannheim (DE)

(73) Assignee: BASF SE, Ludwigshafen (DE)

( * ) Notice: Subject to any disclaimer, the term of this patent is extended or adjusted under 35 U.S.C. 154(b) by 429 days.

(21) Appl. No.: 11/721,404

(22) PCT Filed: Dec. 9, 2005

(86) PCT No.: PCT/EP2005/013228

§ 371 (c)(1),
(2), (4) Date: Jun. 11, 2007

(87) PCT Pub. No.: WO2006/061237

PCT Pub. Date: Jun. 15, 2006

(65) Prior Publication Data

US 2009/0306336 A1     Dec. 10, 2009

(30) Foreign Application Priority Data

Dec. 10, 2004 (DE) .................. 10 2004 059 615

(51) Int. Cl.
*C08G 64/00* (2006.01)
*C08G 63/02* (2006.01)
(52) U.S. Cl. ................. 528/196; 528/198; 528/405; 558/266
(58) Field of Classification Search ............ 528/196, 528/198, 405; 558/266
See application file for complete search history.

(56) References Cited

U.S. PATENT DOCUMENTS

| 3,585,168 A | 6/1971 | Inoe |
| 4,943,677 A | 7/1990 | Rokicki |
| 5,026,767 A | 6/1991 | Inoue et al. |
| 6,211,286 B1 | 4/2001 | Schafheutle et al. |
| 6,617,467 B1 * | 9/2003 | Muller et al. ............ 558/265 |
| 2006/0135743 A1 * | 6/2006 | Park et al. ............ 528/405 |

FOREIGN PATENT DOCUMENTS

WO    WO 03/029325    4/2003

OTHER PUBLICATIONS

International Search Report No. PCT/EP02/10406, dated Mar. 3, 2006, 4 pages.
Soga et al., Alternating Copolymerization of CO, and Propylene Oxide with the Catalysts Prepared from Zn(OH)2 and Various Dicarboxylic Acids, Polymer Journal, vol. 13, No. 4 pp. 407-410, 1981.
International Preliminary Report on Patentability, Chapter II, for International Application No. PCT/EP2005/013228 issued Sep. 7, 2007, 5 pages.

* cited by examiner

*Primary Examiner*—Terressa M Boykin
(74) *Attorney, Agent, or Firm*—Connolly Bove Lodge & Hutz LLP

(57) ABSTRACT

The present invention relates to a process for preparation of polycarbonates with weight-average molar mass $M_W \geq 230,000$ g/mol and with $\leq 2\%$ by weight content of cyclic compounds, including the following steps:

(a) reaction of at least one oxirane with carbon dioxide in the presence of a metal-polycarboxylic acid compound in an aprotic, non-water-miscible solvent at a temperature of from 40 to 120° C. and at a pressure of from 1 to 100 bar, where the molar ratio of monomer to metal-polycarboxylic acid compound is $\geq 75$,
(b) addition of an aqueous solution of an inorganic acid to the reaction mixture once the reaction has ended,
(c) removal of the aqueous phase,
(d) if appropriate, washing of the remaining organic phase with water, and
(e) devolatilization and drying of the resultant slurry of the polycarbonate in the aprotic, non-water-miscible solvent, and to the polycarbonate prepared via the process, and also to the use of the polycarbonate.

7 Claims, No Drawings

US 7,728,099 B2

PREPARATION AND USE OF ULTRAHIGH-MOLECULAR-WEIGHT POLYCARBONATES

CROSS REFERENCE TO RELATED APPLICATION

The present application is a National Stage application of PCT/EP2005/013228, filed Dec. 9, 2005, which claims priority from German Patent application No. DE 102004059615.8, filed Dec. 10, 2004.

The present invention relates to a process for preparation of high-molecular-weight polycarbonates, and also for the use of these polycarbonates for production of grips, pushbuttons, keyboards, and similar consumer articles.

Soft plastics used nowadays in applications such as toys, or as switches, keyboards, or grips, or in body-protection for sports, or in medical technology, or as textile fibers, or as soft closures for drinks bottles, are generally composed of an (amorphous) polymeric material whose glass transition temperature is lowered via addition of a plasticizer and/or of other components so as to produce a soft, flexible surface. This characteristic of the surface is of vital importance for the applications mentioned.

The plastics available on a large industrial scale, e.g. polyolefins (polyethylene and polypropylene), polystyrene, and styrene copolymers, polyamides (nylon-6 and nylon-6,6), polyesters (polyethylene terephthalate and polybutylene terephthalate), polyvinyl chloride, and aromatic polycarbonate, etc., do not have a glass transition temperature below 60° C. or are semicrystalline and therefore not soft, flexible, and/or transparent. This circumstance makes them a rather unsuitable material for applications such as, if appropriate transparent, keyboards, switches or grips, or in toys, in toothbrushes, or for transparent sheathing of writing equipment, of household equipment, of sports equipment, or in the automobile sector.

One example of a suitable polymeric material is plasticized polyvinyl chloride. This polymer has a glass transition temperature of from 80 to 100° C., but addition of, in particular, phthalates gives a material which can be deformed at room temperature without breaking, and is flexible, and has a certain resilience, like rubber.

A disadvantage of a process in which additives have to be added to a polymer is that it is complicated and attended by increased costs. Furthermore, when these plasticized plastics are used in sectors in which direct or indirect contact can occur with organisms, animals, people, plants, or bacteria, a possible result of exudation of the plasticizer components is that the material loses its advantageous properties or that liberation of compounds hazardous to health produces an odor which is unpleasant and/or is hazardous to health. Another considerable disadvantage is that diffusion of the low-molecular-weight additives to the surface can make the surface feel sticky. This type of sticky feel is particularly disadvantageous in products such as toys, switches, keyboards, grips, protective devices, such as table-edge protection, (food) packaging, sports equipment, household equipment, applications in automobile interiors, etc., because this type of sticky feel makes the products unattractive.

For grips, pushbuttons, switches, holders, etc., an individual shape tailored to the individual user or to the appropriate application can moreover be an advantage, alongside a pleasant feel. This is the case, for example, with sports equipment, for example tennis rackets, badminton rackets, squash rackets, etc., and with tools, such as hammers and saws, including compass saws, household equipment which may, if appropriate, be electrically powered, e.g. knives, mixers, including rod mixers, whisks, kneaders, pots, spoons, cutting boards, hygiene utensils, such as toothbrushes, WC brushes, hairdryers, automobile-interior applications, such as steering wheels, shift levers, side walls, seats, and in textiles as fiber, or in medical technology, for example in the form of body-replicating impressions or skin substitutes, etc. This list is not exhaustive and can be extended as desired by the person skilled in the art.

It was therefore an object to provide a polymer which at service temperature, generally room temperature, has a soft and flexible feel, but is not sticky and can reversibly be converted to an individual shape if appropriate at temperatures which can normally be reached in the household sector, for example using hot water or using a hairdryer. The water-absorption of the polymer also has to be zero or very small.

This object can be achieved via an aliphatic polycarbonate with weight-average molar mass $M_w \geq 230\,000$ g/mol and with $\leq 2\%$ by weight content of cyclic compounds.

Similar aliphatic polycarbonates have been disclosed previously in the prior art. U.S. Pat. No. 5,026,676 discloses zinc carboxylates prepared from zinc oxide and glutaric or adipic acid as catalysts in copolymerization of carbon dioxide with oxiranes. This gives polycarbonates with weight-average molar masses $\leq 167\,000$ g/mol and with from 3 to 5% content of cyclic by-products.

U.S. Pat. No. 4,943,677 relates to a process for preparation of polycarbonates via copolymerization of carbon dioxide and oxiranes. The polycarbonates comprise from 3 to 5% of cyclic compounds. In the process, a sterically hindered proton source is used in order to limit the weight-average molecular weight of the polycarbonates prepared.

U.S. Pat. No. 3,585,168 discloses the use of metal alkyl compounds, such as diethylzinc, as catalysts in preparation of polycarbonates from carbon dioxide and oxiranes with molar masses of from 10 000 to 200 000 g/mol.

A process for preparation of polycarbonates from propylene oxide and carbon dioxide is disclosed in I. Hattori, Polymer Journal, Vol. 13, No. 4, pp. 407 to 410 (1981), the catalysts used comprising reaction products of zinc hydroxide and of aliphatic dicarboxylic acids. The weight-average molar masses achieved are up to 210 000 g/mol.

Aliphatic polycarbonates composed of oxiranes and carbon dioxide are particularly suitable for the use desired here, because they exhibit a soft and flexible feel without addition of plasticizers.

However, the documents mentioned disclose processes for preparation of aliphatic polycarbonates from oxiranes and carbon dioxide which are unsuitable for the use mentioned, because their molecular weights are too low, or they absorb water, or they contain relatively large proportions of cyclic contaminants of from 3 to 5%. These cyclic contaminants act as plasticizers for the aliphatic polycarbonates and can cause a sticky surface.

Another result which can easily arise via the sticky surface is adhesion when articles composed of the material mentioned are pressed against one another, and this adhesion causes damage to, or even breakdown of, the surface on separation. The disadvantages mentioned for the aliphatic polycarbonates disclosed by the prior-art documents mentioned can be avoided if polycarbonates prepared via the inventive process are used.

The object of the invention is achieved via a process for preparation of polycarbonates with weight-average molar mass $M_w \geq 230\,000$ g/mol and with $\leq 2\%$ by weight content of cyclic compounds, including the following steps:

(a) reaction of at least one oxirane with carbon dioxide in the presence of a metal-polycarboxylic acid compound in an aprotic, non-water-miscible solvent at a temperature of from 40 to 120° C. and at a pressure of from 1 to 100 bar, where the molar ratio of monomer to metal-polycarboxylic acid compound is $\geq 75$, (b) addition of an aqueous solution of an inorganic acid to the reaction mixture once the reaction has ended, (c) removal of the aqueous phase, (d) if appropriate, washing of the remaining organic phase with water, and (e) devolatilization and drying of the resultant slurry of the polycarbonate in the aprotic, non-water-miscible solvent.

It has been found that particularly high weight-average molar masses $\geq 230\,000$ g/mol are obtained if the molar ratio of monomer to metal-polycarboxylic acid compound in the inventive process for preparation of polycarbonates is $\geq 75$, preferably $\geq 85$, particularly preferably $\geq 90$.

In the inventive process, at least one oxirane is reacted with carbon dioxide. The oxirane that can be used corresponds to the general formula (I)

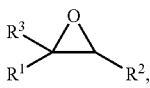
                                                                        I where $R^1$, $R^2$, and $R^3$, independently of one another, are hydrogen or a substituted or unsubstituted, aliphatic hydrocarbon radical having from 1 to 12 carbon atoms, a substituted or unsubstituted, aromatic hydrocarbon radical having from 6 to 18 carbon atoms, a substituted or unsubstituted, alkylaromatic hydrocarbon radical having from 7 to 18 carbon atoms, or a substituted or unsubstituted, araliphatic hydrocarbon radical having from 7 to 18 carbon atoms. Substituents present, if appropriate, on the aliphatic, aromatic, alkylaromatic, or araliphatic radicals are those selected from the group of halogens, such as fluorine, chlorine, bromine, or iodine, functional groups, such as nitrile, ether, carboxy, amine, amide, imine, or imide groups, and, if appropriate, from other aromatic radicals having from 6 to 18 carbon atoms.

In another embodiment of the inventive process, $R^3$ is hydrogen, and $R^1$ and $R^2$ form, with the two carbon atoms of the oxirane functionality, a 4- to 10-membered, preferably a 5- to 8-membered, carbocyclic ring, which may, if appropriate, have substitution with the abovementioned substituents. It is preferable that $R^3$ is hydrogen and that $R^1$ and $R^2$ form a carbocyclic 6-membered ring which has no substitution.

In another preferred embodiment, $R^2$ is hydrogen, and $R^1$ and $R^3$, independently of one another, have been selected from hydrogen or hexyl, pentyl, butyl, propyl, ethyl, or methyl, if appropriate substituted with at least one halogen, or benzyl or phenyl, if appropriate substituted with halogens.

In another preferred embodiment, $R^2$ is methyl, and $R^1$ and $R^3$, independently of one another, have been selected from hexyl, pentyl, butyl, propyl, ethyl, or methyl, if appropriate substituted with halogens, or benzyl or phenyl, if appropriate substituted with halogens.

In another preferred embodiment, $R^1$ is ethyl, and $R^2$ and $R^3$, independently of one another, have been selected from hexyl, pentyl, butyl, propyl, ethyl, or methyl, if appropriate substituted with halogens, or benzyl or phenyl, if appropriate substituted with halogens.

In the inventive process, it is particularly preferable to use an oxirane selected from the group consisting of ethylene oxide, propylene oxide, n-butylene oxide, isobutylene oxide, pentylene oxide, hexylene oxide, epichlorohydrin, styrene oxide, cyclohexene oxide, and mixtures thereof, particularly preferably one selected from ethylene oxide, propylene oxide, isobutylene oxide, cyclohexene oxide, and mixtures thereof.

In the inventive process, it is possible either to use a single oxirane or else to use a mixture of two or more of the oxiranes mentioned. In one preferred embodiment, a mixture of ethylene oxide and propylene oxide is used.

The person skilled in the art is aware of suitable processes for preparation of these oxiranes, for example via oxidation of the corresponding olefins, and for their purification, for example via distillation.

The carbon dioxide that can be used in the inventive process can likewise be prepared, isolated, and/or purified by processes known to the person skilled in the art.

The inventive process is carried out in the presence of a metal-polycarboxylic acid compound. This metal-polycarboxylic acid compound is preferably a metal-dicarboxylic acid compound.

Suitable metals are metals of the alkali metal or alkaline earth metal group, and also of groups 3, 4, 5, 6, 7, 8, 9, 10, 11, and 12, and also the metals of groups 13, 14, and 15 of the Periodic Table of the Elements (new numbering in accordance with IUPAC). Preferred metals are alkali metals, alkaline earth metals, and metals of groups 11 and 12 of the Periodic Table of the Elements. According to the invention it is possible to use a single metal, but it is also possible to use mixtures of two or more metals.

The dicarboxylic acid that may be used corresponds to the general formula (II)

where x is a whole number from 0 to 12, preferably from 1 to 8, particularly preferably 3 or 4. The inventive process may either use metal-dicarboxylic acid compounds which have a single dicarboxylic acid, but it is also possible for various dicarboxylic acids to be present in the metal-dicarboxylic acid compounds.

The inventive process preferably uses a metal-dicarboxylic acid compound in which only one dicarboxylic acid of the general formula (II) mentioned is present.

The metal-dicarboxylic acid compounds that can be used in the inventive process can be prepared by processes known to the person skilled in the art. I. Hattori, Polymer Journal, Vol. 13, No. 4, pp. 407 to 410 (1981) discloses a process for preparation of the metal-dicarboxylic acid compound.

The metal used particularly preferably comprises zinc. The dicarboxylic acid used preferably comprises glutaric acid (x=3), adipic acid (x=4), or a mixture of the two. The metal-dicarboxylic acid compound used in the inventive process very particularly preferably comprises zinc glutarate, zinc adipate, or a zinc dicarboxylate mixture prepared from adipic and glutaric acid.

The inventive process is carried out in an aprotic, non-water-miscible solvent. This solvent is an organic solvent, such as cyclic ethers, alkanes, substituted or unsubstituted aromatic compounds, preferably unsubstituted aromatic compounds, or aromatic compounds substituted with from 1 to 4 $C_1$-$C_4$-alkyl radicals, particularly preferably benzene, toluene, ethylbenzene, or isomers of xylene. The inventive process can be carried out in a single solvent, but it is also possible to use mixtures of two or more of the abovementioned solvents.

The aprotic, non-water-miscible solvent preferably forms an azeotrope with water, i.e. a mixture which cannot be separated via distillation because the constitution in the liquid and in the gas phase are identical. (The contents in the solution correspond to the partial pressures above the solution.)

For the purposes of this invention, "non-water-miscible" means that less than 4%, preferably less than 3%, particularly preferably less than 2%, of the solvent that can be used according to the invention dissolves in water at room temperature (20° C.).

The inventive process includes the following steps:
(a) reaction of at least one oxirane with carbon dioxide in the presence of a metal-polycarboxylic acid compound in an aprotic, non-water-miscible solvent at a temperature of from 40 to 120° C. and at a pressure of from 1 to 100 bar, where the molar ratio of monomer to metal-polycarboxylic acid compound is $\geq 75$,
(b) addition of an aqueous solution of an inorganic acid to the reaction mixture once the reaction has ended,
(c) removal of the aqueous phase,
(d) if appropriate, washing of the remaining organic phase with water, and
(e) devolatilization and drying of the resultant slurry of the polycarbonate in the aprotic, non-water-miscible solvent.

Step (a):

The molar ratio of monomer to metal-polycarboxylic acid compound is $\geq 75$, preferably $\geq 85$, particularly preferably $\geq 90$.

The inventive process is carried out at a temperature of from 40 to 120° C., preferably from 40 to 100° C., particularly preferably from 40 to 90° C. The reaction pressure for the inventive process is from 1 to 100 bar, preferably from 10 to 80 bar, particularly preferably from 20 to 60 bar.

In one preferred embodiment, the process pressure during preparation of the polycarbonate is generated via the carbon dioxide gas. It is moreover also possible for other gases, such as nitrogen and/or noble gases, to be added to the carbon dioxide gas. The reaction may be conducted in stages or continuously. It is preferable that the catalyst forms an initial charge in the reactor in the appropriate aprotic, non-water-miscible solvent, the oxirane is metered in, and the temperature is brought to the desired reaction temperature, while the pressure is adjusted to the intended value using carbon dioxide gas or mixtures of carbon dioxide gas and other gases. It is also possible for a portion of an oxirane to form an initial charge and for another, or the same, oxirane to be added to this at reaction pressure and/or reaction temperature.

Step (b):

Once the reaction has ended, the reaction pressure is lowered to atmospheric pressure. An aqueous solution of an inorganic acid selected from the group consisting of hydrochloric acid, sulfuric acid, phosphoric acid, methanesulfonic acid and mixtures thereof, preferably hydrochloric acid, is then added to the reaction mixture. The acids that can be used are non-sterically-hindered acids. The concentration of the inorganic acid in water is from 0.001 to 20 M, preferably from 0.001 to 10 M, particularly preferably from 0.05 to 5 M. The addition of the aqueous solution of the inorganic acid takes place with constant mixing of the reaction mixture. Good mixing can be achieved via use of, for example, a stirrer, pump equipment, an (Ultra-)Turrax, a static mixer, and similar equipment known to the person skilled in the art. It is preferable to use a static mixer. Another embodiment stirs the material by using an MIC stirrer. Prior to addition of the aqueous solution of the inorganic acid, the reaction mixture can be diluted with a suitable organic solvent. Suitable solvents are aliphatic or aromatic, if appropriate halogenated solvents, such as carbon tetrachloride, chloroform, or methylene chloride. It is possible not only to use a single solvent but also to use a mixture of two or more solvents.

The inventive step (b) gives maximum completeness of removal of residues of the catalyst used and of other by-products.

Step (c):

In this step, the aqueous phase is removed from the organic phase in the two-phase reaction mixture. This can be achieved by processes known to the person skilled in the art. Examples which may be mentioned are decanting or withdrawal of the particular phase with the higher density via an aperture in the lower region of the reactor, always after maximum completeness of phase separation.

Once the aqueous phase has been removed, the polycarbonate prepared takes the form of a slurry in the aprotic, non-water-miscible solvent. The solids content of this slurry is from 5 to 75% by weight, preferably from 10 to 50% by weight, particularly preferably from 15 to 40% by weight.

Step (d):

Once maximum completeness of removal of the aqueous phase has been achieved, the remaining organic phase is, if appropriate, washed with water. The amount of water added and completely mixed for this purpose is from 0.5 to 2 times, preferably from 0.7 to 3 times, particularly preferably from 0.9 to 1.5 times, the amount of organic phase, and this procedure is carried out from 1 to 7 times, preferably from 1 to 5 times, particularly preferably from 1 to 3 times. Prior to the fresh addition of an amount of water, the amount of water from the prior addition is removed, after maximum completeness of phase separation. Methods for mixing and for removal of the aqueous phase are described in step (b) and step (c).

Step (e):

The resultant slurry of the polycarbonate in the aprotic, non-water-miscible solvent is devolatilized and dried by methods known to the person skilled in the art. For this, the phase comprising the polymer may, by way of example, be transferred by means of a pump to an extruder. The devolatilization process is carried out at a temperature of from 80 to 300° C., preferably from 120 to 250° C., particularly preferably from 150 to 220° C. The devolatilization temperature here is preferably above the boiling point of the aprotic, non-water-miscible solvent. The devolatilization process may also be carried out at a pressure below atmospheric pressure, preferably $\leq 800$ mbar, particularly preferably $\leq 500$ mbar, particularly preferably $\leq 200$ mbar. By way of example, the devolatilization and drying processes may be carried out in an extruder or in a devolatilization vessel. It is preferable to use an extruder to devolatilize the polycarbonate slurry. For this, the product mixture is introduced into a twin-screw extruder. The liquid polycarbonate, after devolatilization and/or drying, may be cast in an air bath or water bath to give a strand of dimensions about 2-10 mm, preferably 4-6 mm. This is cut to give particles whose length is from 0.2 to 50 mm, preferably from 1 to 30 mm.

The polycarbonate prepared via the inventive process has weight-average molar mass $\geq 230\,000$ g/mol, preferably $\geq 240\,000$ g/mol, particularly preferably $\geq 250\,000$ g/mol, very particularly preferably $\geq 300\,000$ g/mol.

The glass transition temperature of the polycarbonate prepared via the inventive process is from 10 to 50° C., preferably from 15 to 45° C., particularly preferably from 20 to 40° C.

The polydispersity of the polycarbonate prepared via the inventive process is from 2.0 to 12.0, preferably from 2.5 to 10, particularly preferably from 3.0 to 8.0.

The glass transition temperature depends on the precise reaction parameters. By virtue of variation in pressure and/or temperature, the polymer may comprise not only a carbonate linkage but also ether units. The structure of the product can be clarified by means of NMR and is preferably as follows: $-[(1,2-H_2C_2RR')_{1+n}(OC(=O)O]-$, where $0<n<5$. The glass transition temperature of this random polymer can be tailored to its use.

From 60 to 97%, preferably from 85 to 95%, particularly preferably from 90 to 94%, of the oxirane units preferably ethylene oxide units and propylene oxide units in the polycarbonate prepared by the inventive process have bonding to one another by way of a carbonate group, and from 3 to 40%, preferably from 5 to 15%, particularly preferably from 6 to 10%, have bonding to one another by way of an ether group.

The polycarbonate that can be prepared by the inventive process has particularly low content of cyclic compounds. The content of cyclic compounds is preferably $\leq 2\%$ by weight.

Another way of adjusting the glass transition temperature of the polycarbonates to acceptable values is to synthesize terpolymers starting from propylene oxide, ethylene oxide, and carbon dioxide.

The present invention also provides polycarbonates obtainable via the inventive process, preferably with glass transition temperature of from 10 to 50° C.

The present invention also provides a polycarbonate with weight-average molar mass $\geq 230\,000$ g/mol, preferably $\geq 240\,000$ g/mol, particularly preferably 250 00 g/mol, very particularly preferably $\geq 300\,000$ g/mol, comprising oxirane units and carbon dioxide units, where from 60 to 97%, preferably from 85 to 95%, particularly preferably from 90 to 94%, of the oxirane units have bonding to one another by way of a carbonate group, and from 3 to 40%, preferably from 5 to 15%, particularly preferably from 6 to 10%, have bonding to one another by way of an ether group, and having a glass transition temperature of from 10 to 50° C., preferably from 15 to 45° C., particularly preferably from 20 to 40° C. The oxirane units in the polycarbonate preferably comprise ethylene oxide units and propylene oxide units.

The present invention also provides the use of a polycarbonate in artists' applications, for example as a working material with plastic properties, or in textiles as a fiber, or in medical technology, for example as body-replicating impressions or skin substitute.

The present invention also provides the use of a polycarbonate in production, preferably in coating of handles, of sports equipment, such as tennis rackets, badminton rackets, squash rackets, etc., of household equipment, such as mixers including rod mixers, knives, smoothing irons, whisks, kneaders, pots, spoons, cutting boards, of tools, such as hammers and saws and compass saws, in the automobile sector, examples being steering wheels, switches, side walls, and seats, in production of hygiene utensils, such as toothbrushes, WC brushes, hairdryers, of communication equipment, such as mobile telephones (pushbuttons and grip), and other telephones, and of writing equipment, such as ball-point pens, pencils, and fountain pen holders.

For the purposes of the present invention, "handle" is an area which is present on an article and on which at least two fingers of at least one human hand can be placed in such a way that the article can be held, gripped, operated, and/or used via the at least two fingers.

The polycarbonate in pellet form can be shaped by means of conventional methods known to the person skilled in the art to give a consumer article, or to give a surface coating. Methods particularly suitable for this are those used with thermoplastic molding compositions, examples being injection molding, blow molding, compression molding, coextrusion, kneading, or rolling. The polycarbonate that can be prepared according to the invention is preferably used for, if appropriate partial, surface coating of handles of articles.

To produce grips, by way of example, an injection molding process is used. The processing temperatures used can be from 150 to 230° C., preferably below 200° C. At temperatures above 200° C., disadvantageous decomposition products are produced, functioning as plasticizers or causing a sticky surface.

According to the invention it is possible for the article, preferably the handle, to be composed entirely of the polycarbonate that can be prepared according to the invention, or for a handle to have been coated with polycarbonate that can be prepared according to the invention. The thickness of this coating is from 0.1 to 30 mm, preferably from 0.5 to 10 mm, particularly preferably from 1 to 5 mm.

By way of example, the polycarbonate may be applied in the form of a grip of a tool, of a toothbrush, of writing equipment (ballpoint pen), or of a tennis racket, over a solid core. This method produces a transparent layer over the core. The core is composed of conventional materials, such as metal, wood, plastic, ceramic, or materials which comprise two or more of the materials mentioned. It is also possible to apply a pattern, such as a color pattern or relief pattern, to the core, to protect the core or to apply a decorative effect. For example, a toothbrush core may be given a decorative pattern and may then be covered with a layer composed of the polycarbonate that can be prepared according to the invention, this layer having a particularly attractive feel and being soft and non-sticky.

Another advantage of these polycarbonate grips is the thermal properties of the material. Slight heating can reversibly shape the material, for example the handle, without altering the shape or appearance of the core.

If by way of example, an inventive polycarbonate with glass transition temperature about 25° C. is heated in a glass using domestic hot water (from 45 to 65° C.), it can be converted by hand pressure into an individual shape, for example the shape assumed by the user's hand when it holds the toothbrush during cleaning of the teeth. After cooling to room temperature, this individual shape is fixed for a certain period at room temperature. This time is generally less than 2 months, after which the grip resumes its original shape. The shape-recovery process can also be accelerated via repeated heating, for example using warm water or a hot-air blower. This makes it possible to convert the shaped grip to the original shape or into another shape. The polycarbonate that can be prepared according to the invention can be shaped reversibly via heating to a temperature above the softening point.

Examples of applications in which individual matching to the user is desired are household equipment, tools, hygiene utensils, surgical/medical implements, and sports equipment, where these are held in the hand. Other examples of these applications are sports equipment such as tennis rackets, badminton rackets, squash rackets, etc., household equipment, such as mixers including rod mixers, knives, smoothing irons, whisks, kneaders, pots, spoons, cutting boards, tools, such as hammers and saws and compass saws, in the automobile sector, examples being steering wheels, switches, side walls, and seats, in production of hygiene utensils, such as toothbrushes, WC brushes, hairdryers, communication equipment, such as mobile telephones (pushbuttons and grip), and other telephones, and of writing equipment, such as ball-point pens, pencils, fountain pen holders, artists' applications such as plastic processing material, in textiles as fiber or in medical technology, for example in the form of body-replicating impressions or skin substitutes.

The present invention also provides for a molding which has a handle, the surface of which is coated, if appropriate, partially with the polycarbonate of the invention or is composed of the polycarbonate of the invention. Moldings which have a handle are, for example, sports equipment such as tennis rackets, badminton rackets, squash rackets, etc., household equipment, such as mixers including rod mixers, knives, smoothing irons, whisks, kneaders, pots, spoons, cutting boards, tools, such as hammers and saws and compass saws, in the automobile sector, examples being steering wheels, switches, side walls, and seats, in production of hygiene utensils, such as toothbrushes, WC brushes, hairdryers, communication equipment, such as mobile telephones, other telephones, or writing equipment, such as ball-point pens, pencils, fountain pen holders.

The examples below are intended to provide more detailed illustration of the invention, without restricting the same.

EXAMPLES

Example 1

Synthesis of Polymers

Polycarbonates can be obtained via reaction of epoxides with carbon dioxide by means of a catalyst. A suitable catalyst is zinc glutarate (ZnGlu), which can be obtained via reaction of glutaric acid and zinc oxide (Polymer Journal 1981, 13, 407, or U.S. Pat. No. 5,026,676 Method B in toluene).

a) Polymer starting from propylene oxide/carbon dioxide 40 g of ZnGlu are suspended in 2200 ml of toluene in a 10 l autoclave, and a pressure of 10 bar is generated by applying carbon dioxide under pressure. 1.1 kg of propylene oxide are then added all at once, and the pressure is increased to 30 bar via addition of carbon dioxide. The temperature is then increased to 80° C., and the reaction pressure is set to 55 bar. The polymerization reaction is carried out for 4 hours, and then the pressure is lowered to atmospheric pressure. The suspension of the product in toluene is washed with aqueous hydrochloric acid (from 0.1 to 2.0 M) and water. The phase comprising polymer is removed and then transferred by means of a gear pump to an extruder, and is devolatilized at 190° C. The resultant transparent polymer melt is drawn to give a round fiber of diameter about 5 mm and chopped to give pellets.

The polymer (polymer 1) has carbonate content of 93% (alongside ether linkages) and DSC analysis gives a glass transition temperature Tg of 35° C. Weight-average molar mass is 740 000 g/mol (bimodal, measured against a PMMA standard in HFIP, comprising 0.05% of $KO_2CCF_3$).

The pellets are pressed to give a layer of thickness 3 mm, which appears to the eye to be completely transparent.

Using the same method but different pressures, the following polypropylene carbonates (PPCs) were prepared with glass transition temperatures Tg in the range from 15 to 40° C.

TABLE 1

Polypropylene carbonates with various ether linkage contents

| Polymer No. | Pressure [bar] | Mw [g/mol] | Polydispersity | Ether linkage content [%] | Tg [° C.] |
|---|---|---|---|---|---|
| 3 | 45 | 620 000 | 5.8 | 11 | 32 |
| 4 | 40 | 260 000 | 3.4 | 37 | 20 |
| 5 | 44 | 454 000 | 7.8 | 14.5 | 30 | b) Polymer starting from mixtures of propylene oxide, ethylene oxide, and carbon dioxide 25 g of ZnGlu and 0.71 of toluene are charged to a 3.5 l autoclave, and a pressure of 10 bar is set by applying carbon dioxide under pressure. 720 ml of a mixture composed of propylene oxide and ethylene oxide (80/20) are added at room temperature. During the addition, the temperature is increased to 40° C., and the addition is carried out at a rate of 20 ml/min. The pressure is increased to 30 bar and the temperature is increased to 80° C. At the same temperature, the pressure is increased to 50 bar, and maintained. After stirring for 6 hours, the pressure is lowered to atmospheric pressure, and the slurry of the product is diluted with 500 ml of chloroform. The product slurry is extracted with aqueous hydrochloric acid (500 ml, 0.1 molar), and the product is transferred with a gear pump to an extruder, and is converted to pellets as above. Drying gives 440 g of a transparent polymer. The glass transition temperature Tg is 30° C., and weight-average molar mass is 370 000 g/mol, and 33% of the polymer-$C_2$ backbone results from ethylene oxide (polymer 2).

In comparative experiments, terpolymers were prepared from propylene oxide, ethylene oxide, and carbon dioxide, and had the following properties:

TABLE 2

| Polymer No. | EO units in polymer [%] | Polycarbonate linkage content [%] | Tg [° C.] |
|---|---|---|---|
| 6 | 35 | 93 | 26 |
| 7 | 18 | 90 | 22 |
| 8 | 33 | 93 | 28 |

Example 9

Use of Material for Individual Matching

A layer (110×300 mm) of thickness 0.3 mm of polymer 1, obtained via slot extrusion, is heated in a water bath (T=about 45° C.). The polymer layer becomes flexible. The heated polymer layer is applied to a person's forearm. Once the polymer layer has cooled to ambient temperature it forms a 1:1 impression of the arm, but no body hair sticks to the layer. The same process is carried out on a face. Nose and eyebrows are reproduced at 1:1.

This use is valuable in production of eyeglasses, for protective sports goggles, or for production of an impression for treatment of a fractured arm or for construction of a bust, for example in an artists' application.

Examples 10 and 11

A pencil is coated with polycarbonate 8 by introduction under nitrogen at a temperature of 170° C. into a melt. In order to obtain an individual grip shape, the pencil is then heated by a household hairdryer and shaped via gripping of the hot pencil by the hand in a typical writing position. Moderate pressure has to be exerted here until the polymer coating is at body temperature. This gives an individual grip shape.

A toothbrush composed of polypropylene is coated with polycarbonate 2 by the same process. An individual grip shape is achieved via heating of the item by a household air blower and subsequent hand shaping. This gives a pleasant, personalized grip.

The invention claimed is:

1. A process for preparation of polycarbonates with weight-average molar mass $M_w \geq 230\,000$ g/mol and with $\leq 2\%$ by weight content of cyclic compounds, comprising the following steps:
   (a) reaction of at least one oxirane with carbon dioxide in the presence of a metal-polycarboxylic acid compound in an aprotic, non-water-miscible solvent at a temperature of from 40 to 120° C. and at a pressure of from 1 to 100 bar, where the molar ratio of monomer to metal-polycarboxylic acid compound is $\geq 75$,
   (b) addition of an aqueous solution of an inorganic acid to the reaction mixture once the reaction has ended,
   (c) removal of the aqueous phase,
   (d) if appropriate, washing of the remaining organic phase with water, and
   (e) devolatilization and drying of the resultant slurry of the polycarbonate in the aprotic, non-water-miscible solvent.

2. The process according to claim 1, wherein at least one oxirane has been selected from the group consisting of ethylene oxide, propylene oxide, n-butylene oxide, isobutylene oxide, pentylene oxide, hexylene oxide, epichlorohydrin, styrene oxide, cyclohexene oxide, and mixtures thereof.

3. The process according to claim 1, wherein the metal-polycarboxylic acid compound is a metal-dicarboxylic acid compound.

4. The process according to claim 3, wherein the metal-dicarboxylate compound is zinc glutarate, zinc adipate, or a zinc dicarboxylate mixture prepared from adipic and glutaric acid.

5. The process according to claim 1, wherein the aprotic, non-water-miscible solvent forms an azeotrope with water.

6. The process according to claim 1, wherein the inorganic acid has been selected from the group consisting of hydrochloric acid, sulfuric acid, phosphoric acid, methanesulfonic acid, and mixtures thereof.

7. The process according to claim 1, wherein prior to addition of the aqueous solution of the inorganic acid, the reaction mixture can be diluted with a suitable organic solvent.

* * * * *